April 25, 1939.  C. H. FETTER ET AL  2,155,646

WATCH RATE RECORDER

Filed Nov. 20, 1935  5 Sheets-Sheet 1

INVENTORS: C.H. FETTER
J.G. MATTHEWS

BY J. MacDonald
ATTORNEY

April 25, 1939.    C. H. FETTER ET AL    2,155,646
WATCH RATE RECORDER
Filed Nov. 20, 1935    5 Sheets-Sheet 2

INVENTORS: C.H. FETTER
J.G. MATTHEWS
BY J. MacDonald
ATTORNEY

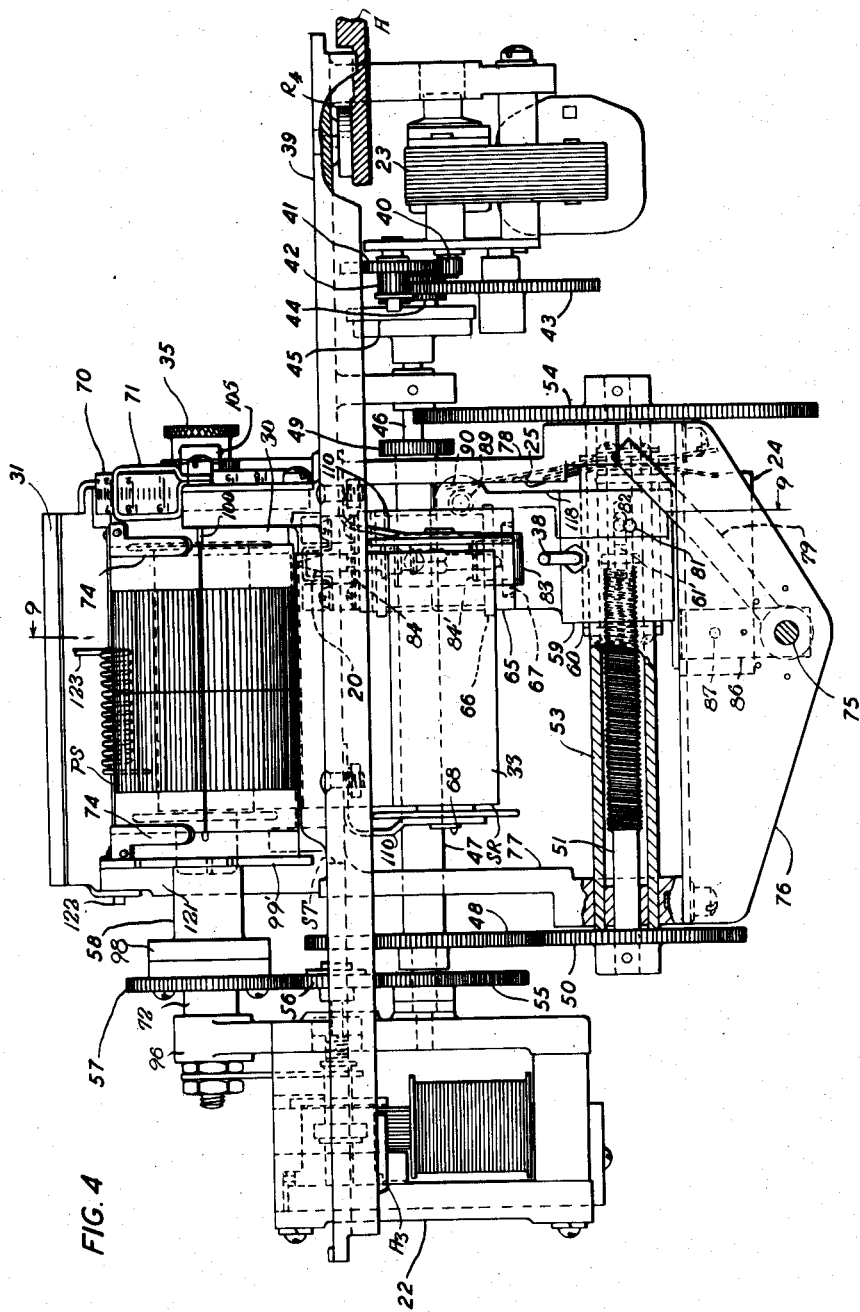

INVENTORS: C.H. FETTER
J.G. MATTHEWS
BY J. MacDonald
ATTORNEY

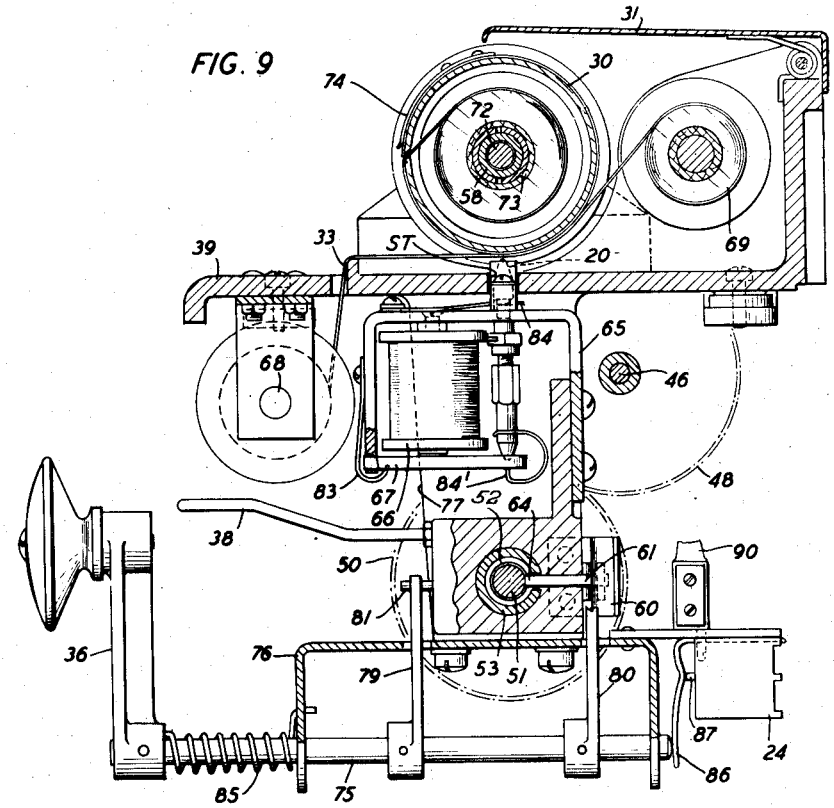
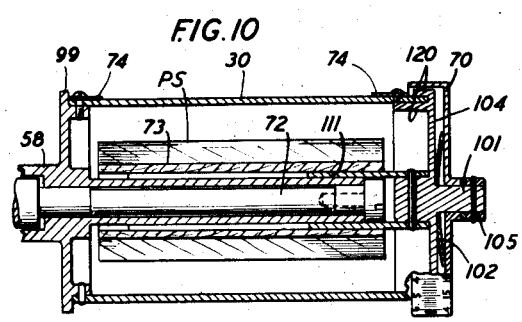
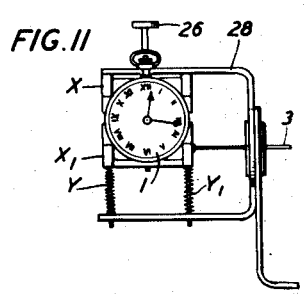
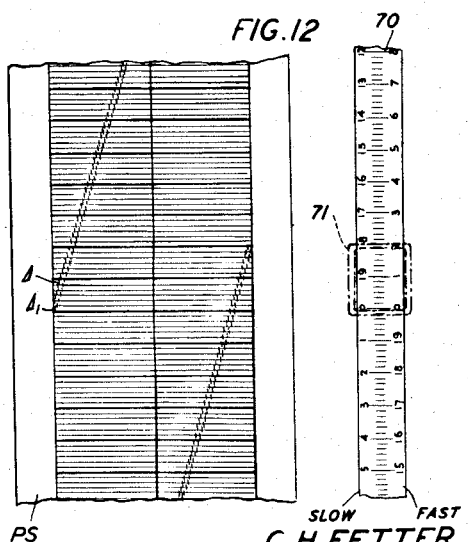

Patented Apr. 25, 1939

2,155,646

UNITED STATES PATENT OFFICE 2,155,646

WATCH RATE RECORDER

Charles H. Fetter, Millburn, N. J., and John G. Matthews, Kew Gardens, N. Y., assignors to Electrical Research Products, Inc., New York, N. Y., a corporation of Delaware Application November 20, 1935, Serial No. 50,702
In Great Britain December 3, 1934

4 Claims. (Cl. 181—0.5)

This invention relates to testing devices and more specifically to a device for measuring and recording the operation of watches, clocks and like time mechanisms.

The object of the invention is to provide a testing device of the type above referred to which will be simple, convenient in use and which will give an accurate indication of the operation of a time mechanism under test in a minimum of time.

According to this invention the operation of a time mechanism is measured and recorded on a paper chart in the form of successive marks representing the vibrations produced by the time mechanism under test. Actuating means is provided for moving the paper chart at a distance per unit of time corresponding to the occurrence of successive vibrations in a standard time mechanism. The paper chart is provided with time lines disposed across its length and in the direction of movement of an electromagnetic recording means in its movement as imparted by the standard, such recording means in turn operating a stylus according to the vibrations produced by the time mechanism under test for printing such time marks on the paper chart, the deviations of the time marks as read with reference to the time lines on the paper chart being an indication of the inaccuracies in the operation of the timepiece under test.

The electrical impulses generated by the operation of the time mechanism under test are transmitted to the electromagnetic recording means through a circuit including a trigger discharge device such as a "Thyratron" (registered trademark) tube which is arranged to act as an oscillator, the period of which is slightly lower than that of the operation of the time mechanism to be tested.

A preferred embodiment of the invention will now be described with reference to the accompanying drawings in which:

Fig. 4 is a front view of the mechanism showing a number of operating parts in section;

Fig. 9 is a cross-sectional view taken on line 9—9 of Fig. 4 and looking in the direction indicated by the arrows;

Fig. 10 is a longitudinal sectional view of the paper chart support;

Fig. 11 is a view of the clamping device used for securing the time mechanism to be tested on the machine; and Fig. 12 is an example of a time record which is read in cooperation with a scale on the paper chart support.

Figure 1:
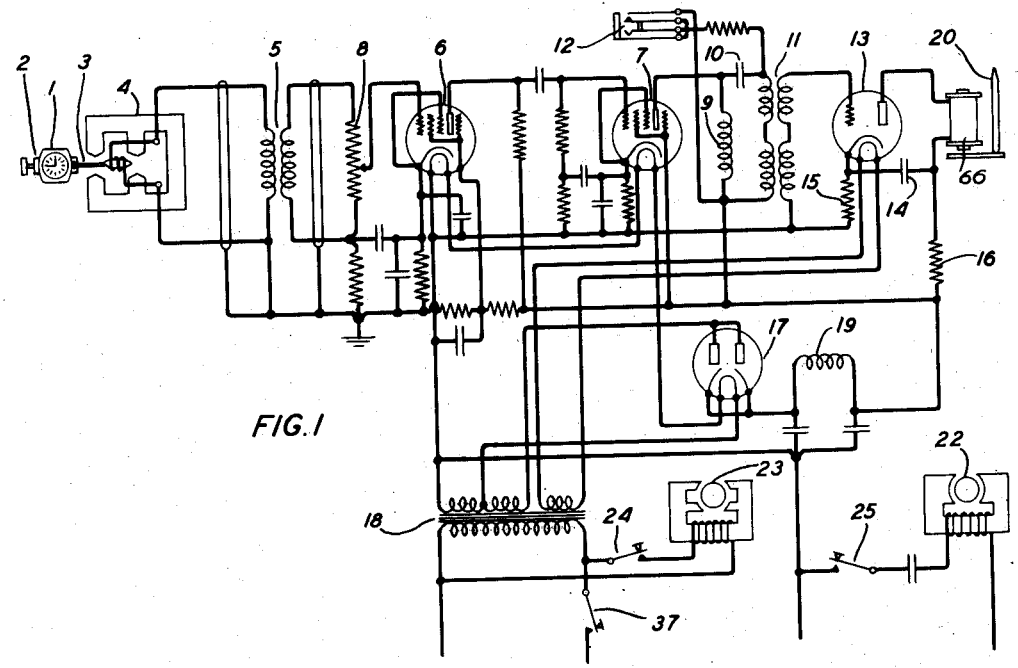
Fig. 1 shows the electrical circuits used in connection with the testing device of the invention.
Figure 2:
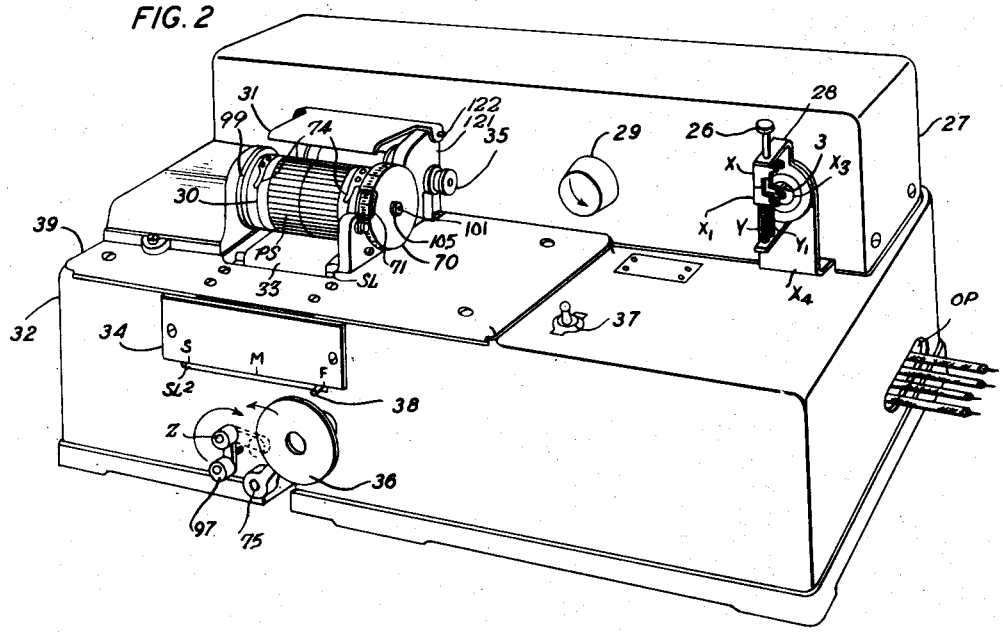
Fig. 2 is a perspective view showing a paper chart on its movable support, the clamping device for the time mechanism and the different controls of the apparatus.

Referring to Figs. 1, 2 and 11, a timepiece mechanism 1 in the form of a watch, for example, to be tested is secured in a clamping device consisting of jaw members X and XI. The jaw member XI is mounted on guiding rods Y3 and Y4 and is normally held in closed position against the jaw member X by springs Y and YI. A plunger 26 is slidably mounted in a frame 28 and is secured at its lower end to the jaw member XI so that the jaw members X and XI may be adjusted or separated the required extent by the movement of this plunger for receiving timepieces of different shape and dimension in sidewise relation to the longitudinal axis of a rod or wire 3, the function of which will be hereinafter described in detail. The frame 28 is pivotally mounted on an upright support X4 and the wire 3, which is provided for transmitting the tick vibrations, is connected to the jaw member XI of the clamping device and extends through an opening in a bushing X3 for connection with the armature of a magnetic converter 4 shown in Fig. 1 which is housed together with the amplifying tubes, "Thyratron" tube and associated circuits in the casing portion 27 of the housing.

The pivotal movement of frame 28 on upright support X4 permits the clamping device to be moved through substantially 90 degrees from the position shown in Figs. 2 and 11 so as to permit the recording of the operation of the time mechanism under test in various angular positions.

The vibrations produced by the escapement impacts in the watch are transmitted from the support assembly through the rod 3 which is in the form of a stiff phosphor bronze wire to the armature of the magnetic converter 4, whose output is a low voltage electrical replica of the vibrational wave train.

The output of the magnetic converter is transmitted through a transformer 5 to an amplifie comprising two resistance coupled pentodes 6 and 7, provided with an adjustable volume controlling potentiometer 8. The amplified signals are then passed through a high-pass filter consisting of an inductance 9, a condenser 10 and a transformer 11, the function of which is to attenuate room noise interference and interference due to mechanical causes and low frequency power disturbances, while still permitting sufficient of the watch signals to pass. The filter may be arranged to have a cut-off frequency of 2500 or 3000 cycles. A head-phone jack 12 permits the amplified watch vibrations or so-called ticks to be listened to, if desired.

The filtered signals are then applied to the grid of a "Thyratron" tube 13 through the transformer coupling 11. The "Thyratron" tube ensures uniform operation of the recorder owing to the fact that the signals transmitted by it are of uniform wave form independent of the wave form of the signals impressed on the grid. In order to increase the sensitivity, the "Thyratron" tube is arranged to act as an oscillator of which the frequency is slightly lower than the watch tick frequency. This is effected by providing a condenser 14 of appropriate value in the output circuit of the tube, the condenser being charged with direct current through resistances 15 and 16. The direct current may be supplied by a battery, or, as illustrated, by a rectifier 17 connected through a transformer 18 to an alternating current source and having a ripple eliminator 19 in its output circuit. The transformer 18 also supplies the required filament heating currents to the tubes 6, 7 and 13 and the rectifier 17, the plate voltages for the tubes 6, 7 and 13 being supplied by the rectifier 17. When the grid and plate voltages of the "Thyratron" tube 13 are of the proper value a current flows in the plate circuit of the tube until the voltage across the condenser 14 has dropped to a value lower than that required to operate the tube. When the current ceases to flow, condenser 14 begins immediately to be charged up through the resistances, and a recurrent discharge is thus produced at a frequency dependent upon the values of the condenser and resistances. By adjusting this frequency to a frequency slightly lower than the watch tick frequency the "Thyratron" circuit is arranged to be self-biased or primed at the time when the watch tick voltage is impressed on the grid of the tube. The value of this voltage which causes the discharge to commence in the tube slightly in advance of its normal discharge due to its action as an oscillator is considerably lower than if the oscillatory circuit were not present. The output impulses of the "Thyratron" tube energizes a magnet 66 for actuating a stylus 20 shown in Figs. 1, 3, 4 and 9 for printing marks on a paper chart in a manner that will be hereinafter described in detail.

Figure 3:
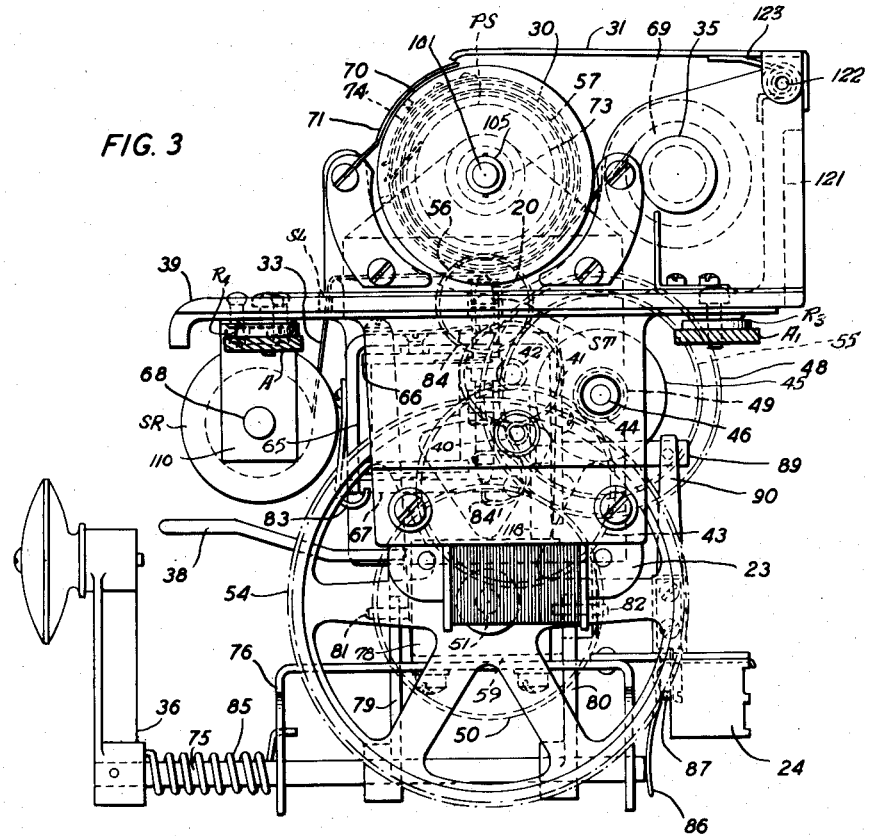
Fig. 3 is a right-hand view shown with the mechanism housing removed and showing portions of the mounting in sections.
Figure 5:
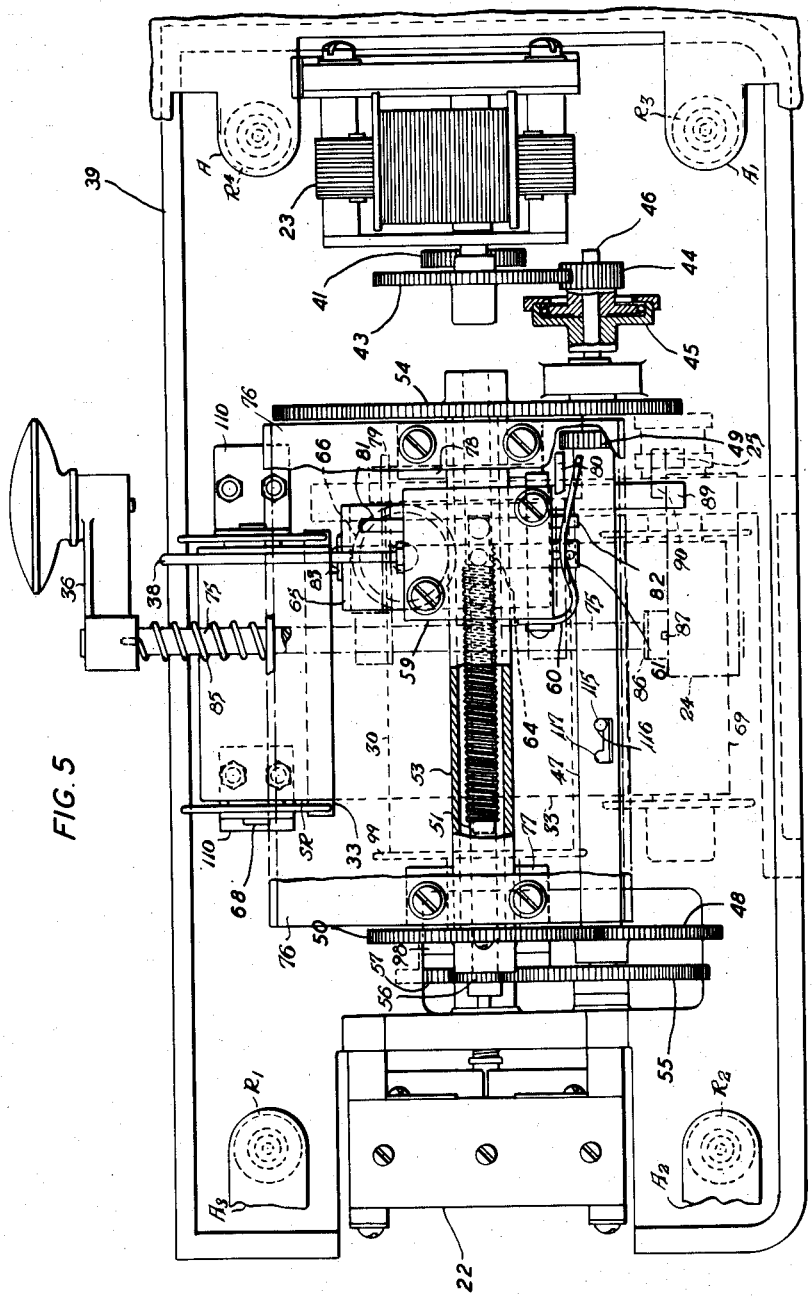
Fig. 5 is a view of the under side of the mounting plate showing a number of operating parts and portions of the mounting plate support in section.

A synchronous motor 22 shown in Figs. 1, 4 and 5 is driven from a constant frequency source and is energized upon the closure of a switch 25 for rotating the paper chart support 30 at a number of revolutions per second equal to the standard beat or operation of the watch. As the synchronous motor 22 is not self-starting a shaded pole induction motor 23 is connected to the record support through an overrunning clutch 45 of the free wheeling type shown in Figs. 3, 4 and 5 so as to start the synchronous motor and to bring it to its synchronous speed. As shown in Figs. 3, 4 and 9 the stylus 20 is positioned underneath and radial to the paper chart support 30 inside the main portion 32 of the casing. This stylus travels along a slot ST in the mounting plate 39 through the operation of a carriage 59. This carriage is slidably mounted on a stationary sleeve 53 supported at both ends by arms 77 and 78 downwardly extending from the mounting plate 39. Carriage 59 is provided with a longitudinally movable member 61 having its comb-shaped or threaded end 64 for engaging a lead screw 51 provided for moving the carriage and the stylus 20 mounted thereon in line parallel with respect to the turning axis of the record support 30. The stylus 20 is reciprocated through the energization of magnet 66 and a retractile spring 84 to produce a record on the recording strip through the intermediary of a carbon ribbon 33 on a supply roller SR journaled in similarly shaped brackets 110. This carbon ribbon passes through a slot SL in the mounting plate 39 and between the cylinder 30 and the stylus 20 to a take-up roller 69 provided with an ordinary feed ratchet knob 35 for advancing the ribbon when it becomes worn. A starting crank 36 is mounted on a shaft 75 supported in bearings in a plate 76, the latter being secured to the extreme ends of arms 77 and 78 as shown in Figs. 3, 4, 5 and 9.

The operation of the crank 36 as for moving the shaft 75 axially against the resistance of a ribbon spring 86 closes the switch 24 for energizing the starting motor 23, whereas the subsequent rotating movement of crank 36, as to rotate the shaft 75 in a counter-clockwise direction from the position shown in Fig. 2, is effective to move the arms 79 and 80 carried thereby in position wherein the arm 80 engages a camming spring 60 shown in Figs. 5 and 9 for disengaging the comb member 61 from the lead screw 51 for permitting the return movement of the carriage 59 and the stylus 20 mounted thereon to normal starting position at the left end of the lead screw 51. The return movement of carriage 59 is effected through the engagement of arms 79 and 80 with the studs 81 and 82 extending laterally from two opposite sides of the carriage as shown in Figs. 3, 4 and 5. The lapse of time required for the return movement of carriage 59 to the starting position through the manual rotation of crank 36 is sufficient for the motor 22 and therefore the cylinder 30 to reach synchronous speed, provided, of course, that the switch 25 was closed prior to the operation of crank 36, this crank being afterward returned to normal position shown in Fig. 2 under the tension of a coiled spring 85.

A latch or stop 97 shown in Fig. 2 may then be moved on its pivot Z in a counter-clockwise direction an angular distance of substantially 270 degrees in abutting relation with the crank 36 as shown by the dotted lines for preventing the movement of this crank prior to the completion of a recording operation. The position of the stylus 20 in its movement across the paper chart on the cylinder 30 is indicated by a pointer 38 in cooperation with marks S, M and F on a plate 34 secured to the front of casing portion 32. This pointer is mounted on the carriage 59 and extends through a slot SL2 formed by the edge of the casing portion 32 and the edge of plate 34.

A power switch 37 shown in Figs. 1 and 2 is provided for switching on and off the supply of electrical power. The power leads and also the leads from the source of constant frequency current enter the mechanism housing through an opening OP in the right side of casing portion 32 for connecting with the different electrical apparatus.

According to the construction of this device the driving mechanism for actuating the record strip support 30 as shown in Figs. 3, 4, 5 and 9 is mounted on to the under side of plate 39 which, inturn, is mounted on rubber cushions R1, R2, R3 and R4 for preventing extraneous vibrations affecting the operation of the electromagnetic converter 4. These rubber cushions are interposed between the plate 39 and arm portions as A, A1, A2, A3 formed with the casing portion 32 of the mechanism housing.

The drive is transmitted from the starting motor 23 through gears 40, 41, 42, 43 and 44 and the overrunning clutch 45 shown in cross-section in Fig. 5 to a shaft 46. Keyed on the shaft 46, but longitudinally slidable thereon is a sleeve 47 carrying gears 48 and 49. When the sleeve is in the position shown in Figs. 4 and 5, i. e., when the pin 115 engages the recess 116 in the sleeve 47 the gear 48 meshes with a gear 50 mounted on one end of lead screw 51. A gear 54 is mounted on the other end of the lead screw 51 so that when the sleeve 47 on the shaft 46 is moved to the right, where the pin 115 engages the recess 117, the gear 48 becomes disengaged from the gear 50 and the drive is then transmitted to the lead screw 51 through gears 49 and 54.

The operation of starting motor 23 is transmitted to the synchronous motor 22 through the shaft 46 and gear 55 secured thereon engaging a gear 56 on the armature shaft of the synchronous motor 22. The gear 56 transmits its movement to the recording strip support through a gear 57 secured to the disc portion 98 of the hub 58 of the record strip support 30 which will be hereinafter described in detail.

The carriage 59 is formed with an upright supporting plate 118 best seen in Fig. 9 provided for securing an inverted U-shaped bracket or heel piece 65 on which the electromagnet 66 which is supplied with currents from the output circuit of the "Thyratron" tube is mounted. Armature 67 is held in pivotal relation on the heel piece 65 of magnet 66 by a spring 83, and on the free end of this armature is mounted the stylus 20 which is held in adjusted position thereon by a spring 84', a spring 84 being provided for retracting the stylus 20 and its operating armature to normal unoperated position after each energization of magnet 66.

The energization of magnet 66 under the influence of the electrical impulses as generated by the operation of the time mechanism under test causes the stylus 20 to strike the carbon ribbon against the record paper on then rotating cylinder 30 and thus produce on and across the paper a series of marks corresponding to the watch ticks under test.

A projection 89 shown in Figs. 3, 4 and 5 laterally extending from the upright supporting plate 118 of carriage 59 engages a spring member 90 when this carriage and stylus 20 are in the recording end of lead screw 51, that is, when the record is completed so as to open the switch 25 in the circuit of the synchronous motor 22.

The position of the gears carried by the sleeve 47 determines the speed at which the stylus travels along the cylinder. With gears in the position shown, that is, with the drive transmitted through the gears 48 and 50, the stylus, as in this example, traverses the record strip in five seconds while when the sleeve is moved to the right so that the drive is transmitted through the gears 49 and 54, the gear ratio is such as to move the stylus across the record strip in thirty seconds, while the speed ratio of the stylus with respect to the operation of the record strip may be changed to correspond to any unit of time desired.

In the preferred form of the invention the paper chart support shown in Figs. 2, 3, 4, 9 and 10 consists of a spindle 72 secured at one end in an upright member 96 formed with the mounting plate 39 and on this spindle is rotatably mounted the hub 58 formed with an enlarged portion 98 for securing the gear 57, and a flange portion 99 is provided adjacent this enlarged portion for securely mounting one end of the cylinder or drum 30 in concentric relation with respect to the hub 58. The spool 73 for the roll of record paper PS as shown in Figs. 9 and 10 is mounted on a sleeve 111 having one of its ends slotted for frictionally engaging the hub 58. This sleeve carries at its other end a disc portion 104 having rim portions 120 forming a circular recess for receiving the end of cylinder 30 and on the lateral projection 20 101 of this disc is loosely mounted a dial drum 70 having marks and numbers at its periphery spaced to represent the value of the time lines on the paper chart or strip PS. The drum 70 is frictionally held in adjusted position with respect to a vernier 71 shown in Figs. 2, 3, 4 and 12 by a spider spring 102 interposed between the disc 104 and the dial drum 70, a collar 105 keyed to the projection 101 being provided for holding the dial drum 70 on the projection 101 against the tension of spider spring 102.

One end of the record paper PS is passed out from a slot 100 in the cylinder 30 and then guided around the cylinder on which it is held by a pair of clips 74.

On the upper extending portion 121 of plate 39 is mounted as on pivot 122 a paper cutter 31 extending beyond the ends of the paper strip support for engaging upon a manually applied pressure thereon the periphery of disc 99 for preventing the turning movement of this support when a completed record is being detached from the roll, a spring 123 being provided for normally holding this paper cutter in its retracted position clear of the periphery of disc 99 as shown in Figs. 2, 3, 4 and 9.

An example of the operation of the device of the invention for testing and recording the time rate of a watch is as follows:

With the record strip positioned on the cylinder 30 as shown in Figs. 2 and 4, the watch to be tested is placed between the jaw members X and X1 of the clamping device, and the switches 25 and 37 are moved to the closed position. The closing of these switches, howeevr, is ineffective to cause the operation of motors 22 and 23 due to the fact that the switch 24 in the circuit of the starting motor 23 is still open and the synchronous motor 22 does not start until driven by the starting motor 23. The latch 97 is then turned from the position shown in dotted lines in Fig. 2 to the position shown in full lines, that is, counter-clockwise for releasing the starting crank 36 when the latter is moved axially against the tension of the spring 86 and turned in a counter-clockwise direction until arrested by the stud Z of the latch. The axial movement of shaft 75 is effective to operate the spring 86 for closing the switch 24 through the operation of switch pin 87 and thereby closing the operating circuit of starting motor 23 and the turning movement of crank 36 in a counter-clockwise direction is effective to engage the arms 79 and 80 with the projections 81 and 82 for moving the carriage 59 and stylus 20 carried thereby to the starting position at the left-hand side of the record strip.

The operation of starting motor 23 is effective to start the synchronous motor 22 for actuating the lead screw 51 and cylinder 30 through any one of the gearing mechanisms previously described. The tension of spring 85 is effective to return the crank to its initial rotary position and the spring 86 moves the shaft 75 axially for opening the switch 24 and stopping the starting motor 23.

The carriage 59 and the stylus carried thereby are then moved from left to right across the record strip at constant speed through the engagement of comb 64 with the lead screw 51, the comb being then held in engaged relation with the lead screw through the tension of camming spring 60.

The number of turns of cylinder 30 corresponds to the frequency of the watch ticks when the operation of the watch is correct. Each tick of the watch as above mentioned causes the energization of magnet 66 for actuating the stylus 20 and hereby producing a mark on the record strip by means of the carbon ribbon 33. The successive ticks produce a line of such marks across the record strip in parallel relation to the time lines printed on such record strip if the operation of the watch is correct and progressively deviating from such straight lines according to the "slow or fast" operation of the watch.

When the stylus has traversed the whole width of the record strip the projection 89 carried by the upright portion 118 of carriage 59 engages the operating member 90 of switch 25 for opening it, thus stopping the synchronous motor 22 and thereby the cylinder 30. The completed record is then pulled away from the cylinder and torn off against the paper cutter 31 which is first moved manually a small angular distance on its pivot 122 against the resistance of its retractile spring 123 for engaging the periphery of the flange 99 of cylinder 30 for preventing its turning movement when the printed record is detached from the roll. The act of pulling out the completed record while holding the cylinder stationary draws out a certain length of blank record strip around the cylinder from the roll PS so that a fresh portion of blank record strip is positioned for a subsequent recording operation.

Figure 6:
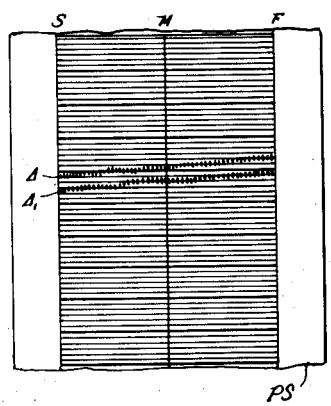
Figs. 6, 7 and 8 show various examples of watch rate records printed according to the invention.
Figure 7:
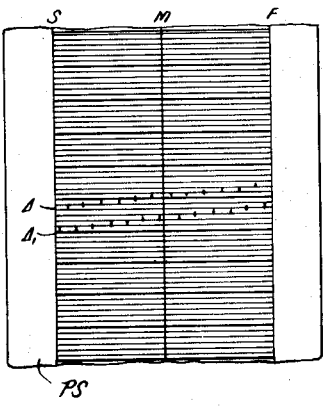
Figure 8:
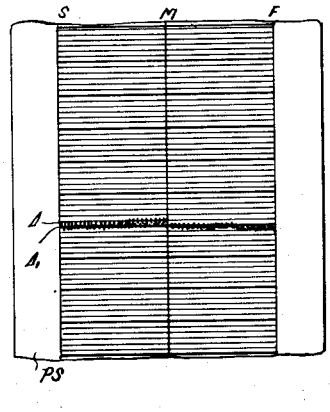

Examples of watch speed records produced by the recorder device of the invention are shown in Figs. 6, 7, 8 and 12. Figs. 6 and 8 show records taken when the stylus takes thirty seconds to travel across the record strip and Fig. 7 is a record taken when the stylus takes five seconds to traverse the record strip. In Fig. 6 each time-line on the paper chart represents five seconds variation per day and the record travereses between two and three lines upward from left to right. Consequently, the watch under test is about thirteen seconds per day "fast". In Fig. 7 since the stylus takes five seconds to travel across the record strip, that is, six times faster than in the previous example each space between the time lines on the record strip equals five times six or thirty seconds so that the watch is about one hundred and twenty seconds per day "fast". Fig. 8 is an example of a thirty-second record made to include two watch positions, that is, one in the vertical position and the other in the horizontal position as the record crosses the center line on the paper chart. This record indicates a rate of about four seconds per day "fast" in the horizontal position and twelve seconds per day in the vertical position.

Fig. 12 is an example of a record indicating the operation of a time mechanism as in the process of balancing the flywheel or the initial adjustment of any time mechanism. In practice such a reading is readily effected by rotating the chart support for placing the starting point of the record in registry with the edge of paper cutter 31, when this cutter is positioned against the periphery of disc 99. The dial drum 70 is then rotated relative to the paper strip or chart support an amount sufficient to place the zero mark of the dial "fast scale" to the lower edge of the vernier 71 as shown in Fig. 12, thus indicating twelve spaces beyond a complete length or turn of the paper chart which is divided into 120 of such time lines or equivalent to 600 seconds, the rate of such a time mechanism thus being $$\frac{600+60}{60} = 1 \text{ hour and 1 minute fast}$$

a day. Similarly, if the time mechanism is "slow" the zero mark of the dial "slow scale" is positioned to the top edge of the vernier.

The difference in time in the oscillation of a balance wheel in the time mechanism under test is indicated by the extent of the spacing between the recorded time marks as $\Delta, \Delta 1$ in each of the records in Figs. 6, 7, 8 and 12.

In addition to the testing and recording of the time rate in watches the invention is well adapted for testing and recording the time rate of other time or vibrating mechanisms which are too large to mount in the clamping device. This is accomplished by clamping one end of a relatively stiff phosphor bronze wire to the object to be tested and the other end of this wire to the clamping device of the recorder.

The sensitivity of the electrical pick-up is such that the tick vibrations transmitted through the undulations of the wire 3, which may be several feet long, are sufficient for the proper operation of the recorder.

If it is desired to hear the amplified watch ticks to assist in analyzing inaccuracies in the operation of a time mechanism, this may be done by means of a head-phone connection plugged into the jack 12 shown in Fig. 1.

It is understood that minor changes may be made in the device of the invention without departing from the spirit of the invention and the scope of the appended claims.

What is claimed is:

1. In a device for recording the rate of a timepiece, said device comprising an electromagnet operable upon each beat of the timepiece, a drum rotated at a constant speed, a predetermined angular distance for each beat of a correct timepiece, a record receiving sheet carried on said drum, a driving mechanism for moving said electromagnet in a path parallel to the axis of rotation of said drum and a stylus reciprocated by said electromagnet for impressing marks on said record receiving sheet at intervals of time corresponding to the beats of the timepiece under test.

2. In a device for recording the rate of a timepiece, said device comprising a yieldable holder for the timepiece caused to vibrate upon the change in motion of the anchor and escapement wheel of the timepiece, means for translating such vibrations into electrical impulses, an electromagnet having an armature, an amplifier circuit connecting said translating means and said electromagnet, a drum, a record sheet rotated by said drum, a stylus carried by said armature for impressing a series of marks on said recording sheet in a direction transverse to the direction of rotation of said sheet to represent the operation of the timepiece, and motor means for rotating said drum one turn for each beat of a correct timepiece.

3. The method of recording the rate of a watch which comprises rotating a drum at a rate corresponding to the rate of a standard watch, operating a stylus to mark the drum with a frequency determined by the rate of the watch to be tested, and causing relative movement of the stylus and drum parallel to the axis of rotation of the drum in addition to the operation of the stylus to mark the drum.

4. The method of recording the rate of a watch which comprises rotating a drum at a rate corresponding to the rate of a standard watch, causing a stylus to peck against the drum with a frequency controlled by the beat of the watch to be tested, and at the same time causing relative movement of the stylus and drum in a direction lengthwise of the drum.

CHARLES H. FETTER.
JOHN G. MATTHEWS.